United States Patent
Sams et al.

(10) Patent No.: US 9,764,336 B2
(45) Date of Patent: Sep. 19, 2017

(54) PETROLEUM DESALTING UTILIZING VOLTAGE MODULATION

(75) Inventors: Gary W Sams, Spring, TX (US); S. Pavankumar B. Mandewalkar, Houston, TX (US)

(73) Assignee: Cameron Solutions, Inc., Houston, TX (US)

( * ) Notice: Subject to any disclaimer, the term of this patent is extended or adjusted under 35 U.S.C. 154(b) by 638 days.

(21) Appl. No.: 13/812,979

(22) PCT Filed: Aug. 5, 2011

(86) PCT No.: PCT/US2011/046713
§ 371 (c)(1),
(2), (4) Date: Jan. 29, 2013

(87) PCT Pub. No.: WO2012/019082
PCT Pub. Date: Feb. 9, 2012

(65) Prior Publication Data
US 2013/0126357 A1    May 23, 2013

Related U.S. Application Data
(60) Provisional application No. 61/371,046, filed on Aug. 5, 2010.

(51) Int. Cl.
| B01D 17/06 | (2006.01) |
| C02F 1/463 | (2006.01) |
| B03C 11/00 | (2006.01) |
| B01D 17/04 | (2006.01) |

(52) U.S. Cl.
CPC ............ *B03C 11/00* (2013.01); *B01D 17/045* (2013.01); *B01D 17/06* (2013.01); *C02F 1/463* (2013.01); *B03C 2201/02* (2013.01)

(58) Field of Classification Search
CPC ......... B01D 17/06; C02F 1/4604; C02F 1/463
See application file for complete search history.

(56) References Cited

U.S. PATENT DOCUMENTS

| 4,149,958 A | 4/1979 | Martin |
| 4,182,672 A | 1/1980 | Martin |
| 4,188,277 A | 2/1980 | Martin |

(Continued)

FOREIGN PATENT DOCUMENTS

| GB | 2083838 | 3/1982 |
| WO | 2006043819 A1 | 4/2006 |

*Primary Examiner* — Brian W Cohen
(74) *Attorney, Agent, or Firm* — Gable Gotwals

(57) ABSTRACT

A method of removing entrained salt containing water from an inlet crude oil stream includes the steps of applying an electrical energy to at least one electrode of a plurality of horizontally oriented, spaced-apart electrodes (12, 14, 16) housed within an elongated desalting vessel (10) and distributing an inlet crude oil stream between the electrodes. Each electrode in the plurality of electrodes is housed in an upper portion of the desalting vessel and may be in communication with a first, second and third transformer (42, 44, 46), respectively. The electrical energy may be at a single frequency and voltage or at a modulated voltage. Or, the electrical energy may be a modulated frequency at a single or modulated voltage. Fresh water may be mixed with the inlet crude oil stream either exteriorly or interiorly of the vessel.

11 Claims, 2 Drawing Sheets

(56) References Cited

U.S. PATENT DOCUMENTS

| | | | |
|---|---|---|---|
| 4,209,374 A | 6/1980 | Martin | |
| 4,391,698 A | 7/1983 | Wagner | |
| 7,351,320 B2 | 4/2008 | Sams | |
| 2003/0217971 A1* | 11/2003 | Varadaraj | B01D 17/045 |
| | | | 210/639 |
| 2004/0094421 A1 | 5/2004 | Sams | |
| 2008/0156649 A1 | 7/2008 | Sams | |
| 2009/0159426 A1* | 6/2009 | Chen | B01D 17/06 |
| | | | 204/167 |
| 2009/0159534 A1* | 6/2009 | Bjorklund | B01D 17/06 |
| | | | 210/708 |
| 2011/0253539 A1 | 10/2011 | Akdim | |

\* cited by examiner

PETROLEUM DESALTING UTILIZING VOLTAGE MODULATION

CROSS-REFERENCE TO RELATED APPLICATIONS

This application is the U.S. National Phase of PCT Patent Application No. US2011/046713 filed on 5 Aug. 2011, which claims priority to U.S. Provisional Patent Application No. 61/371,046 filed 5 Aug. 2010, both of which are incorporated herein by reference.

BACKGROUND

This invention relates generally to crude oil desalter/dehydrator vessels and, more specifically, to desalter/dehydrator vessels which utilize a set of electrodes.

A common crude oil desalter/dehydrator used by many of the world's refiners was invented by Petreco in 1980 and is illustrated and described in U.S. Pat. Nos. 4,149,958; 4,182,672; 4,188,277 and 4,209,374 ("the Petreco patents.") Desalters/dehydrators marketed under the Petreco patents have been referred to as BILECTRIC® desalters (hereinafter "bilectric desalter"). A bilectric desalter utilizes a set of two or three parallel electrodes arranged horizontally in a horizontal vessel. After the crude oil containing salt is prepared by adding fresh water, the oil-water mixture is introduced horizontally into the vessel and between these electrodes. This technique of desalting coalesces the dispersed water in an intense electrostatic field and has the advantage of achieving rapid and highly efficient droplet coalescence and separation.

Historically, a bilectric desalter utilizes two or three AC power units (transformers) designed to operate at a single voltage. Each power unit is connected to a separate, horizontally oriented electrode. The power unit on the lowest electrode establishes an AC electrostatic field between the oil/water interface and the energized electrode. This lowest electrode is intended to provide sufficient voltage to diminish and control the formation of a "rag" layer at the oil/water interface. If the applied voltage is not an effective one, the interface rag can accumulate which, in turn, places a greater power demand on the power unit. This effectively reduces the applied voltage and results in a less effective process to control the rag.

The middle (or upper) electrode establishes an electrostatic field between itself and the lowest electrode. This electrostatic field remains effective unless the rag layer intrudes into the zone between the electrodes and compromises the applied voltage. Finally, the upper electrode establishes an electrostatic field between the middle electrode and itself. The performance of this field is rarely compromised by the formation of an interface rag.

When an interface rag consisting of an unresolved oil/water emulsion accumulates on the oil/water interface, the interface rage hinders the strength of the electrostatic field which, in turn, leads to water chaining and shorting of the electrodes. To avoid the detrimental effects of water chaining, the AC voltage may need to be reduced. This reduction in voltage further compromises the bilectric desalter's ability to promote decay of the rag layer. The strength of the AC electrostatic field also limits the entrained water content to no more than 10%. When the water content increases above 10% the water droplets chain together and promote a shorting of the electrostatic fields.

As crudes become heavier and more difficult to desalt and dehydrate, they tend to form rag layers that are more stable and less likely to collapse in the presence of an electrostatic field. These "rag-producing" oils compromise the overall dehydration and desalting performance of the bilectric desalter.

SUMMARY OF THE INVENTION

A method of removing entrained salt containing water from an inlet crude oil stream includes the steps of (1) applying a voltage and frequency to one or more horizontally oriented, spaced-apart electrodes housed within an elongated vessel and (2) exposing the inlet crude oil stream entering the vessel to the electric field being reduced. As illustrated in the 2×2 matrix below, four different configurations of frequency and voltage (I to IV below) can be applied to the one or more electrodes.

| Voltage | Frequency | |
|---|---|---|
| | Single (>60 Hz) | Variable or modulating |
| Modulated | II | I |
| Single, steady | III | IV |

Each electrode in the plurality of electrodes is housed in an upper portion of the vessel and at least one of the electrodes is in communication with a transformer. The transformer may provide a multiple frequency electrical energy to its respective electrode. Fresh water may be mixed with the inlet crude oil stream either exteriorly or interiorly of the vessel. The vessel may include a mud wash system of a kind known in the art and located in its lower portion.

The use of a modulating, high frequency AC field can increase the energy available to control or prevent the formation of the rag layer and re-establish the desalting and dehydration performance of a bilectric desalter. Using one to three modulating, high frequency power units, the electrostatic strength can be optimized to promote maximum rag collapse and water droplet growth. Furthermore, because a modulating voltage field promotes effective coalescence in crude oil with very little entrained water (<3%), it achieves a significantly greater coalescence with crude oil containing up to 10% BS&W (known as basic sediment and water). Also, modulated fields handle entrained water cuts significantly greater than 10%, thereby permitting the use of more water so the removal of entrained salt is improved.

Objects of this invention are to provide an improved system and method for removing entrained salt containing water from a heavy crude oil stream that supplies an effective electrostatic field for treating these heavy crude oils while at the same time preventing rag layer formation, controlling and stabilizing any formed rag-layer, and avoiding water chaining and shorting of the electrodes.

BRIEF DESCRIPTION OF THE DRAWINGS

FIG. 2 is in the method of FIG. 1, the salt is removed from the crude oil by electrostatic dehydration without the use of fresh water whereas in FIG. 2 fresh water is mixed with the salty crude prior to the crude oil entering vessel 10.

Figure 1:
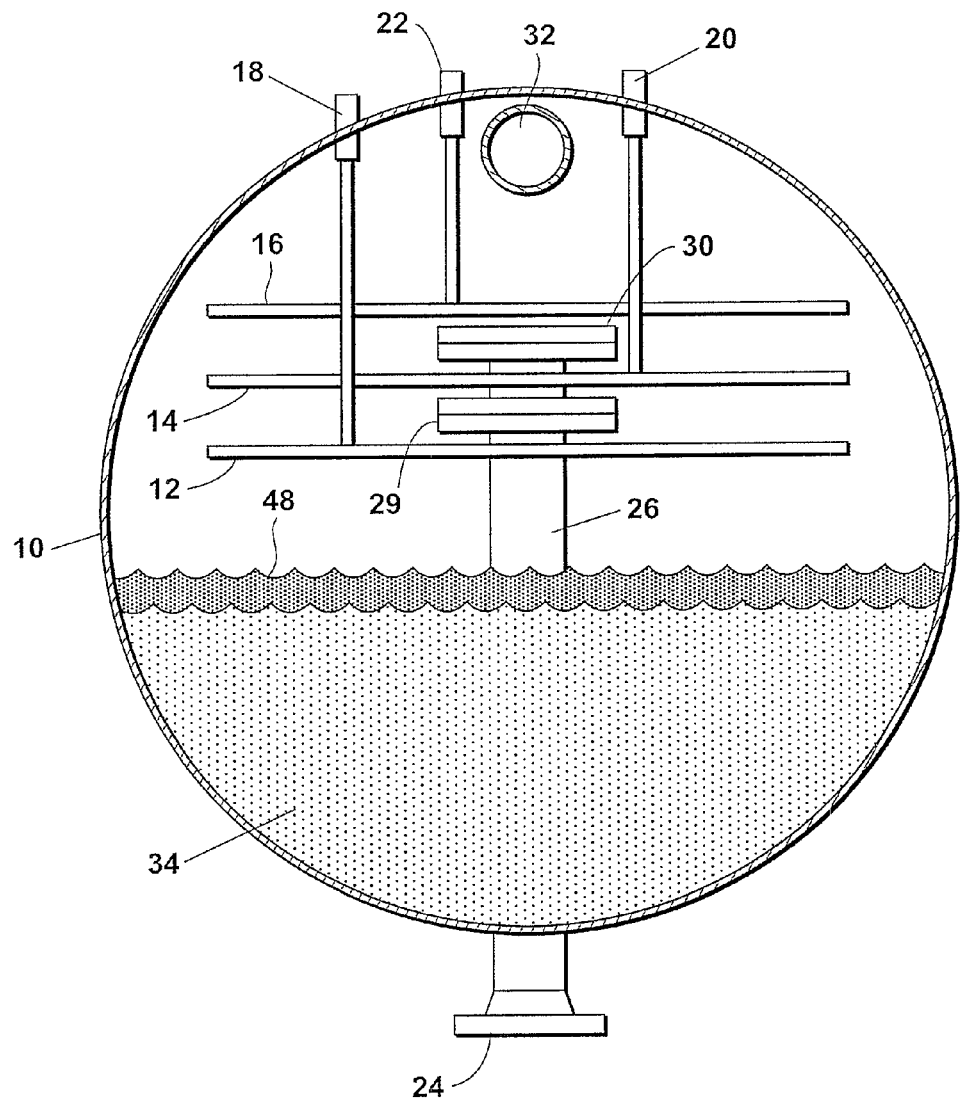
FIG. 1 is a cross-sectional view of an elongated horizontal vessel of the type that can be used to practice the systems and methods of this invention. The elongated vessel 10 has three spaced-apart horizontal electrodes identified by the numbers 12, 14 and 16. Voltages are applied to the three electrodes by conductors 18, 20 and 22 extending exteriorly of vessel 10.

Listing of Elements Used in the Drawings and Detailed Description

| | | | |
|---|---|---|---|
| 10 | Vessel | 32 | Outlet collector |
| 12 | Lower electrode | 33 | Crude oil discharge |
| 14 | Middle electrode | 34 | Salt containing water |
| 16 | Upper electrode | 42 | Transformer in communication with 18 |
| 18 | Conductor in communication with 12 | 44 | Transformer in communication with 20 |
| 20 | Conductor in communication with 14 | 46 | Transformer in communication with 22 |
| 22 | Conductor in communication with 16 | 48 | Rag layer |
| 24 | Crude oil inlet | 50 | Fresh water inlet pipe |
| 25 | Horizontal distributor pipe | 54 | Opening |
| 26 | Vertical distributor pipe | 56 | Water outlet pipe |
| 27 | Inlet valve | 58 | Control valve |
| 28 | Pump | 60 | Level control |
| 29 | Horizontal liquid outlet | 62 | Mud wash pipe |
| 30 | Horizontal liquid outlet | | |

DETAILED DESCRIPTION OF THE PREFERRED EMBODIMENTS

Referring first to FIG. 1, in one method of practicing this invention, fresh water is mixed with salty crude exteriorly of vessel 10. A crude oil inlet 24 connects through an inlet valve 27 (see FIG. 2) to vertical pipes 26 that have horizontally discharging liquid outlets 28 and 30. Crude oil, having excessive salt therein, typically in the form of salt water, is passed upwardly from inlet 24 through pipes 26 and is horizontally discharged through outlets 28 and 30 to thereby spread the incoming crude oil and water mixture between electrodes 12 and 14 and 14 and 16, respectively. By means of electrostatic voltages applied to electrodes 12, 14 and 16, salt containing water 34 is condensed out of the crude oil within the vessel 10 and settles to the bottom of the vessel 10. The crude oil having water substantially removed passes out of the vessel through outlet collector 32 and crude oil discharge 33. Not shown in FIG. 1 is a water outlet discharge control system, such as can be provided by a float or level control system.

Figure 2:
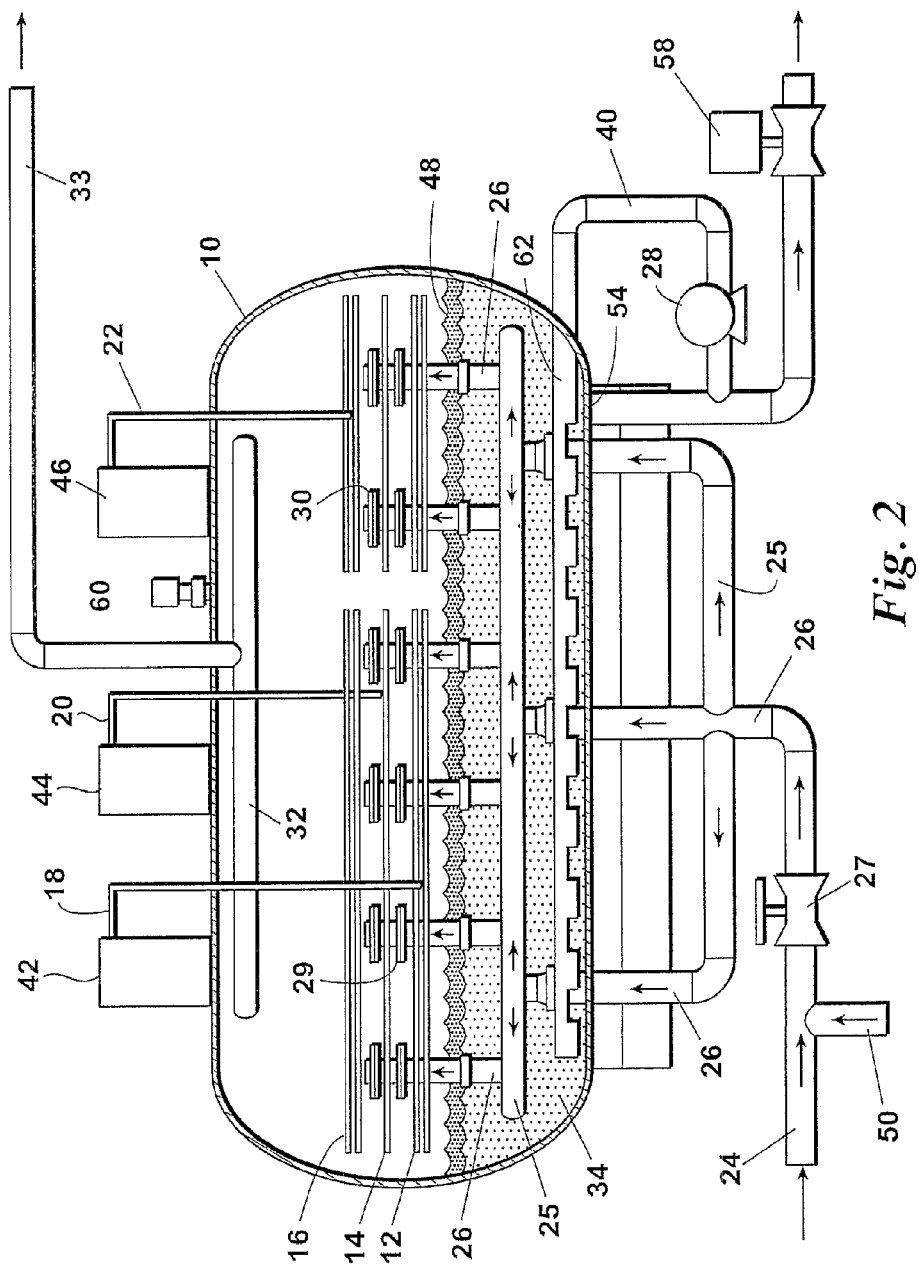
FIG. 2 shows a system and method that employs the basic concepts of the system of FIG. 1. The system of FIG. 2 includes an elongated horizontal vessel 10 having lower, middle and upper electrodes 12, 14 and 16 supplied with electrical energy by conductors 18, 20 and 22, a crude oil inlet 24 with vertical pipes 26 each having horizontal liquid outlets 29 and 30, an outlet collector 32 and salt containing water 34 collected in the bottom of the vessel 10. The essential difference between the method of FIG. 1

Referring now to FIG. 2, in another method of practicing this invention, fresh water passing through fresh water inlet pipe 50 is mixed with crude oil before the crude oil enters vessel 10 through crude oil inlet 24. The fresh water dilutes salt from the crude oil, forming salt containing water 34 that tends to settle to the bottom of vessel 10. By means of a level control system (not shown), a level of salt containing water 34 is maintained in the vessel while the crude oil, substantially free of salt, exits the vessel through outlet collector 32 and crude oil discharge 33.

The system of FIG. 2 includes an elongated horizontal vessel 10 having therein lower, middle and upper electrodes 12, 14 and 16 supplied with electrical energy by conductors 18, 20 and 22; a crude oil inlet 24 with vertical pipes 26 each having horizontal liquid outlets 29 and 30; an outlet collector 3; and salt containing water 34 collected in the bottom of the vessel, all as illustrated and described with reference to FIG. 1.

In the system of FIG. 2, salt containing crude oil is delivered to vessel 10 through crude oil inlet pipe 24. Fresh water is conveyed into vessel 10 through a fresh water inlet pipe 50. The mixed crude oil and fresh water passes through mix valve 27 into the interior of vessel 10 through horizontal distributor pipes 25, into vertical distributor pipes 26 and through a plurality of lower and upper liquid outlets 29 and 30. Salt from the crude oil is diluted into the fresh water thereby forming salt water mixed with the crude oil from which salt has been at least substantially removed. The mixed crude oil and fresh water is subjected to electrostatic fields supplied on electrodes 12, 14 and 16. The electric fields augment separation of the crude oil and water, the salt containing water 34 settling to the lower portion of vessel 10 and the crude oil rising to the upper portion. The crude oil floating on the water layer 34 forms a rag layer 48 which consists of an unresolved oil and water mixture. Rag layer 48 separates the water 34 within the vessel from the crude oil.

Salt contained in the crude oil delivered into pipe 24 is contacted and diluted in the resulting water passing into the vessel through pipe 50. The salt containing water 34 is then separated from the crude oil by electrostatic actions within the upper portion of the vessel, the electrostatic action being provided by electrodes 12, 14 and 16. The crude oil, having at least a significant portion of salt removed, collects in the upper portion of the vessel and exits the vessel through outlet collector 32 from which the reduced salt content crude oil can be conveyed for refining.

Water is collected into the lower portion of vessel 10 from two sources. The first is salt water normally contained in crude oil that enters crude oil inlet 24. The second is fresh water flowing into the vessel through inlet 50. Water leaves vessel 10 through an opening 54 communicating with a water discharge pipe 56. A control valve 58 operated by a level control 60 maintains the height of the water interface within the vessel indicated by the level of rag layer 48.

The desalter shown in FIG. 2 includes a system of keeping vessel 10 free from the accumulation of solids that in the petroleum industry is frequently called "mud." For this purpose the desalter system of FIG. 2 includes a mud wash system that utilizes a horizontal perforated, mud wash pipe 62 laying on or adjacent the interior bottom of tank 10. One end of perforated mud wash pipe 62 is connected to the outlets of pump 28 by mud wash piping 40 while the intake of pump 28 is connected to water discharge or outlet pipe 56. Thus pump 28 circulates salt containing water 34 to stir up and carry with it mud that settles to the bottom of tank 10. At the same time salt containing water is discharged through control valve 58 and away from the system through water outlet pipe 56.

The essential difference between the system and method of FIG. 1 and that of FIG. 2 is that in the system and method of FIG. 1, the salt is removed from the crude oil by electrostatic dehydration without the use of fresh water whereas in FIG. 2 fresh water is mixed with the salty crude prior to the crude oil entering vessel 10. In both systems the mixed crude oil and fresh water are subjected to electric fields within the vessel to cause the salt water to separate from the crude oil by the means of the imposition of electrical charges on electrodes 12, 14 and 16.

Illustrated in FIG. 2 are transformers 42, 44 and 46 having conductors 18, 20 and 22 that transfer voltages to electrodes 12, 14 and 16. In the practice of this invention, transformers

18, 20 and 22 provide multiple frequency electrical energy (see quadrants I to IV in table below) to electrodes 12, 14 and 16 that substantially improves the electrostatic separation of the water contained in the crude oil from the crude oil itself. The concept of utilizing dual frequency electrostatic coalescence is described in detail in U.S. Pat. Nos. 6,860,979 and 7,351,320, which are hereby incorporated by reference. As a result of improved electrostatic coalescence achieved by the unique voltages provided by transformers 42, 44 and 46, separation of salt water from the crude oil is substantially enhanced and thereby salt is more effectively removed from the crude oil. As illustrated in the 2×2 matrix below, four different configurations of frequency and voltage (I to IV below) can be applied to the one or more electrodes. Preferably, vessel 10 makes use of the configurations of quadrants II and III.

| | Frequency | |
|---|---|---|
| Voltage | Single (>60 Hz) | Variable or modulating |
| Modulated | II | I |
| Single, steady | III | IV |

As previously mentioned, a problem encountered in desalters of the type that employ electrostatic separation is the formation of rag that is indicated by the numeral 48 in FIG. 2. If the applied voltage in the system is not effective the interface rag 48 can accumulate and impose more demands upon the power units. By the system of this invention wherein multiple frequency electrostatic coalescence is employed, the detrimental effects of the occurrence of interface rag is substantially reduced.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

What is claimed is:

1. A method of removing water containing entrained salt from an
   inlet crude oil stream, the inlet crude oil stream being fed into a vessel housing an upper, a middle, and a lower electrode,
   said electrodes being oriented horizontally and vertically spaced apart from one another,
   the upper electrode being in communication with a first AC modulated transformer,
   the lower electrode being in communication with a second AC modulated transformer,
   the middle electrode being grounded,
   the method comprising:
   applying to the upper electrode a first AC electrical energy provided by the first AC modulated transformer, the first AC electrical energy having an amplitude and a frequency greater than 60 Hz;
   applying to the lower electrode a second AC electrical energy provided by the second AC modulated transformer, the second AC electrical energy having an amplitude and a frequency greater than 60 Hz, the first and second AC electrical energies differing from one another in amplitude, frequency, or both amplitude and frequency;
   exposing an inlet crude oil stream to an electric field produced by the first and second AC electrical energies, one electric field being between the upper and middle electrodes and another electric field being between the middle and lower electrodes.

2. A method according to claim 1 further comprising at least one of the first and second AC modulated transformers modulating an amplitude of a respective AC electrical energy.

3. A method according to claim 1 further comprising at least one of the first and second AC modulated transformers modulating a frequency of a respective AC electrical energy.

4. A method according to claim 1 wherein the vessel is a horizontal vessel.

5. A method according to claim 1 further comprising diluting the inlet crude oil stream with a volume of fresh water.

6. A method according to claim 1 wherein the volume of fresh water in the diluted inlet crude oil stream is greater than 3% and less than 10% of the combined inlet crude oil and fresh water stream.

7. A method according to claim 1 wherein the water containing entrained salt in the inlet crude oil stream is less than 3%.

8. A method according to claim 7 wherein the water containing entrained salt in the inlet crude oil stream is in a range of 0.1% to 1%.

9. A method of removing water containing entrained salt from an inlet crude oil stream when the inlet crude oil stream is within a separator vessel, the method comprising:
   producing a first electrostatic field in the separator vessel between an upper electrode and a grounded middle electrode by applying to the upper electrode a first AC electrical energy provided by a first AC modulated transformer, the first AC electrical energy having an amplitude and a frequency greater than 60 Hz;
   producing a second electrostatic field in the separator vessel between the grounded middle electrode and a lower electrode by applying to the lower electrode a second AC electrical energy provided by a second AC modulated transformer, the second AC electrical energy having an amplitude and a frequency greater than 60 Hz;
   the upper, grounded middle, and lower electrodes being oriented horizontally and spaced vertically from one another, the first and second AC electrical energies differing from one another in amplitude, frequency, or both amplitude and frequency.

10. A method according to claim 9 further comprising at least one of the first and second AC modulated transformers modulating an amplitude of a respective AC electrical energy.

11. A method according to claim 9 further comprising at least one of the first and second AC modulated transformers modulating a frequency of a respective AC electrical energy.

* * * * *